United States Patent [19]

Pugsley et al.

[11] 4,214,276
[45] Jul. 22, 1980

[54] PRINTING METHODS FOR PRODUCING PRINTS HAVING IMAGES OF VARIABLE SIZE AND TEXT

[75] Inventors: Peter C. Pugsley, Pinner; Peter J. Wood, Potters Bar, both of England

[73] Assignee: Crosfield Electronics Limited, London, England

[21] Appl. No.: 809,684

[22] Filed: Jun. 24, 1977

[30] Foreign Application Priority Data

Jun. 28, 1976 [GB] United Kingdom ............... 26842/76

[51] Int. Cl.$^2$ ............................................. H04N 1/00
[52] U.S. Cl. ........................................ 358/256; 354/5; 354/7
[58] Field of Search ........................... 354/5, 6, 7, 11; 358/256, 285, 287

[56] References Cited

U.S. PATENT DOCUMENTS

| | | | |
|---|---|---|---|
| 3,626,824 | 12/1971 | Kolb et al. ................................ 354/7 |
| 3,750,554 | 8/1973 | Debus et al. ............................. 354/5 |
| 3,754,459 | 8/1973 | Coleman et al. ........................ 354/7 |

Primary Examiner—Richard Murray
Assistant Examiner—Joseph A. Orsino, Jr.
Attorney, Agent, or Firm—Kemon & Estabrook

[57] ABSTRACT

To produce a whole page image from a number of separate images, the input images are separately scanned and reproduced at the required enlargement or reduction to produce pre-prints which are then assembled on a digitizer table in the relative positions required for the finished page; signals representing the boundaries of these positions are generated and stored; the boundary representing signals then control the derivation of output signals suitable for a scanner making the whole-page reproduction, each whole-page line signal including the line signals for each of the input images crossed by the page line, the output signals controlling the treatment of a sheet or surface for use in the preparation of a printed page.

6 Claims, 8 Drawing Figures

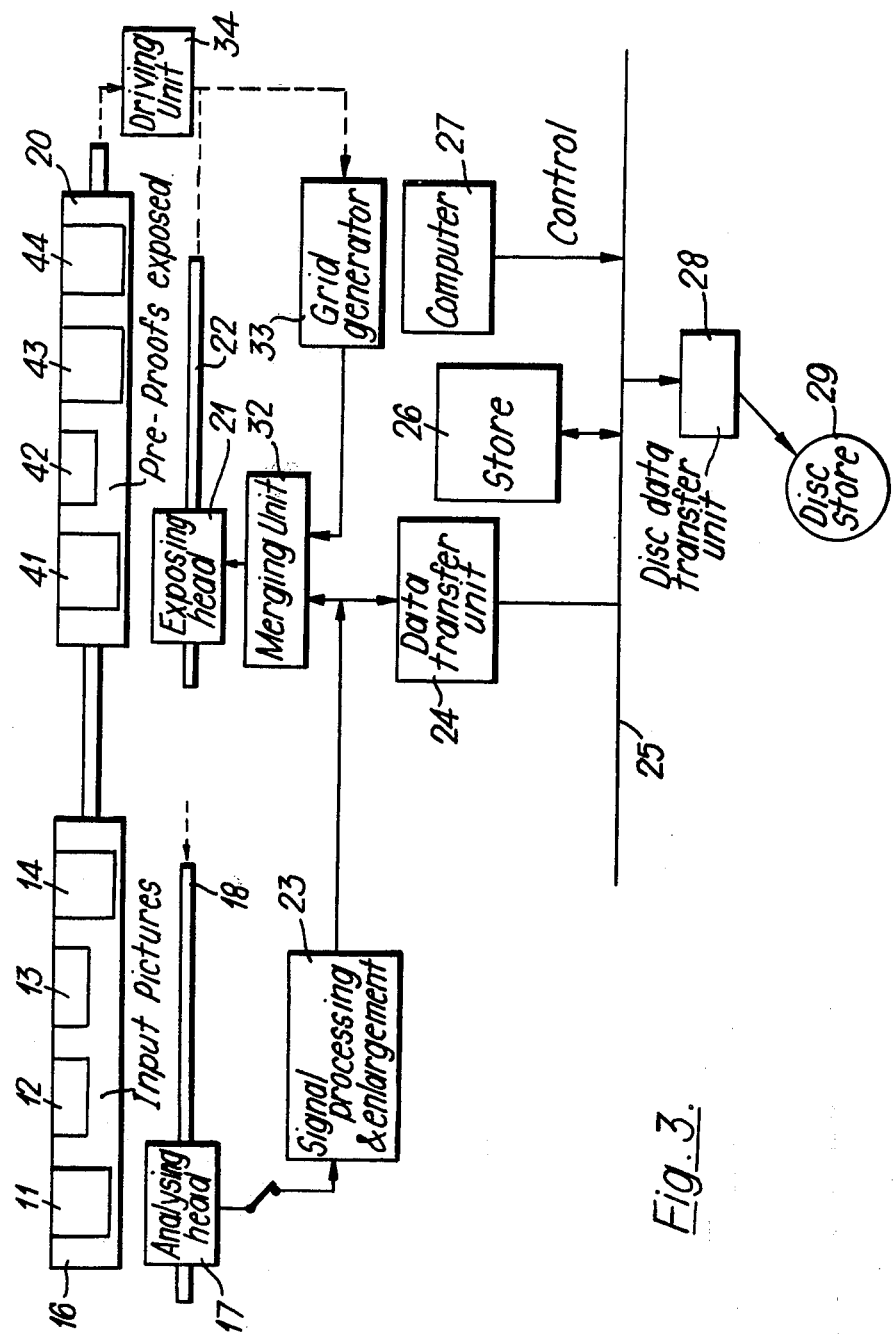

PRINTING METHODS FOR PRODUCING PRINTS HAVING IMAGES OF VARIABLE SIZE AND TEXT

This invention relates to a method and apparatus for composing a page of pictures, or a page of mixed pictures and text matter, the term "text matter" including logos, for example. The conventional methods have a high manual content and are very time consuming; in addition, the conventional methods do not lend themselves to automatic quality control.

According to the present invention a method of image reproduction for forming a whole image from a number of separate input images, comprises scanning each of the input images and reproducing it at the the required enlargement or reduction to produce a pre-print; assembling all the pre-prints on a digitiser table in the relative positions required for the finished page; placing a position-sensing device on the digitiser table at points defining the boundaries of the required picture portions to be reproduced, and generating corresponding boundary-representing signals defining the positions of these points; transferring the said boundary representing signals into a store; under the control of the said boundary signals, deriving output signals including line signals for each of the input images crossed by the page line, within the limits defined by the said boundary representing signals for the input image; and using the output signals to control the treatment of a sheet or surface for use in the preparation of a printed page.

Where text is to be mixed with the pictures, a reproduction of the text at the required size can be mounted on the digitiser table with the pictures; the text is preferably made up on a transparent base. The position-sensing device is then used to define the approximate outline of each area of text. The position-sensing device may also be arranged to provide other make-up data, for example, the colour of the print, insertion of coloured tint blocks and borders, whether one or two superimposed picture parts is the overlay or underlay, and so on.

The "pre-print" will not normally be a print but a reproduction on photgraphic film base. The production of the pre-prints (which need not be of a high quality) greatly facilitates the assembly of the pictures in their required relative positions and sizes in the whole-page reproduction.

In the preferred method embodying the invention, the signals initially derived by scanning the pictures to be included in the page are stored at the same time that the pre-print is prepared; then, when the positional and other make-up data has been derived by means of the digitising table the computer derives from the store in a line-by-line manner the signals representing those portions of the pictures which are to be included in the finished page; these signals can be transferred by the computer to another store in their correct order for the required page or they can be used to expose a light sensitive film directly, for example. In an alternative method, the signals initially derived for the pre-print are not stored but instead after the make-up data has been derived by means of the digitising table a drum carrying the pictures is scanned again under the control of the make-up signals, to provide the data for exposing the film.

Text matter can be introduced in the exposure or final stage to fill in the areas left for this matter; in our preferred method the text matter is placed on a scanner and is scanned to provide electric signals which, jointly with the picture signals from the store, control the output device (for example, the exposing head). As the resolution required for text matter is generally higher than that required for pictures, it is convenient to scan the text matter at a resolution which is an integral multiple n of the resolution of the pictorial matter, each line of the pictorial matter being repeated n times, once for each line of the high-resolution scanning of the text scanner.

In order that the invention may be better understood, an example of a system embodying the invention will now be described with reference to the accompanying drawings.

In the drawings:

FIGS. 3 to 6 illustrate portions of the apparatus of FIG. 2 which are operative at different stages in the preparation of the page;

Figure 1:
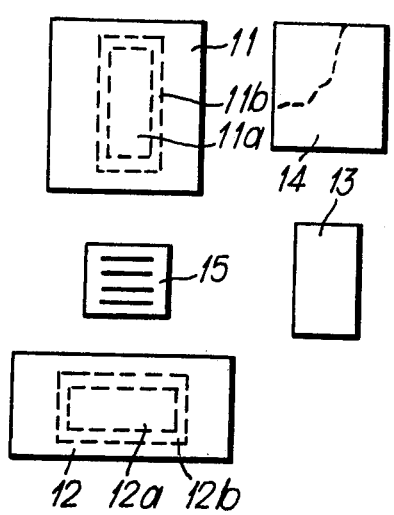
FIG. 1 illustrates the pictures and text which are to form the required page.

FIG. 1 of the drawings represents original pictures 11, 12, 13 and 14 and an area of text 15 to be reproduced on a page, the boundaries 11a and 12a illustrating the areas of potential interest for the page on pictures 11 and 12 and the boundaries 11b and 12b representing the areas which will be scanned. It will be seen that in each picture the area scanned is rather greater than the area of potential interest.

Figure 4:
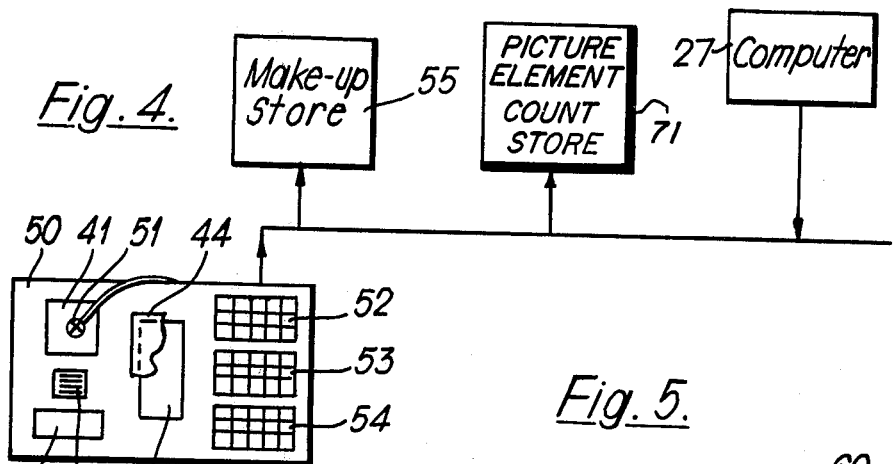
Figure 5:
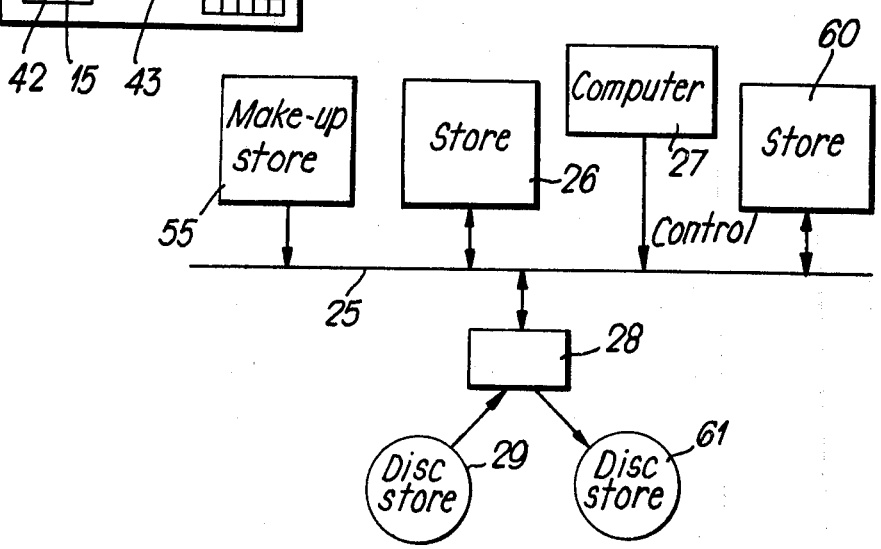
Figure 2:
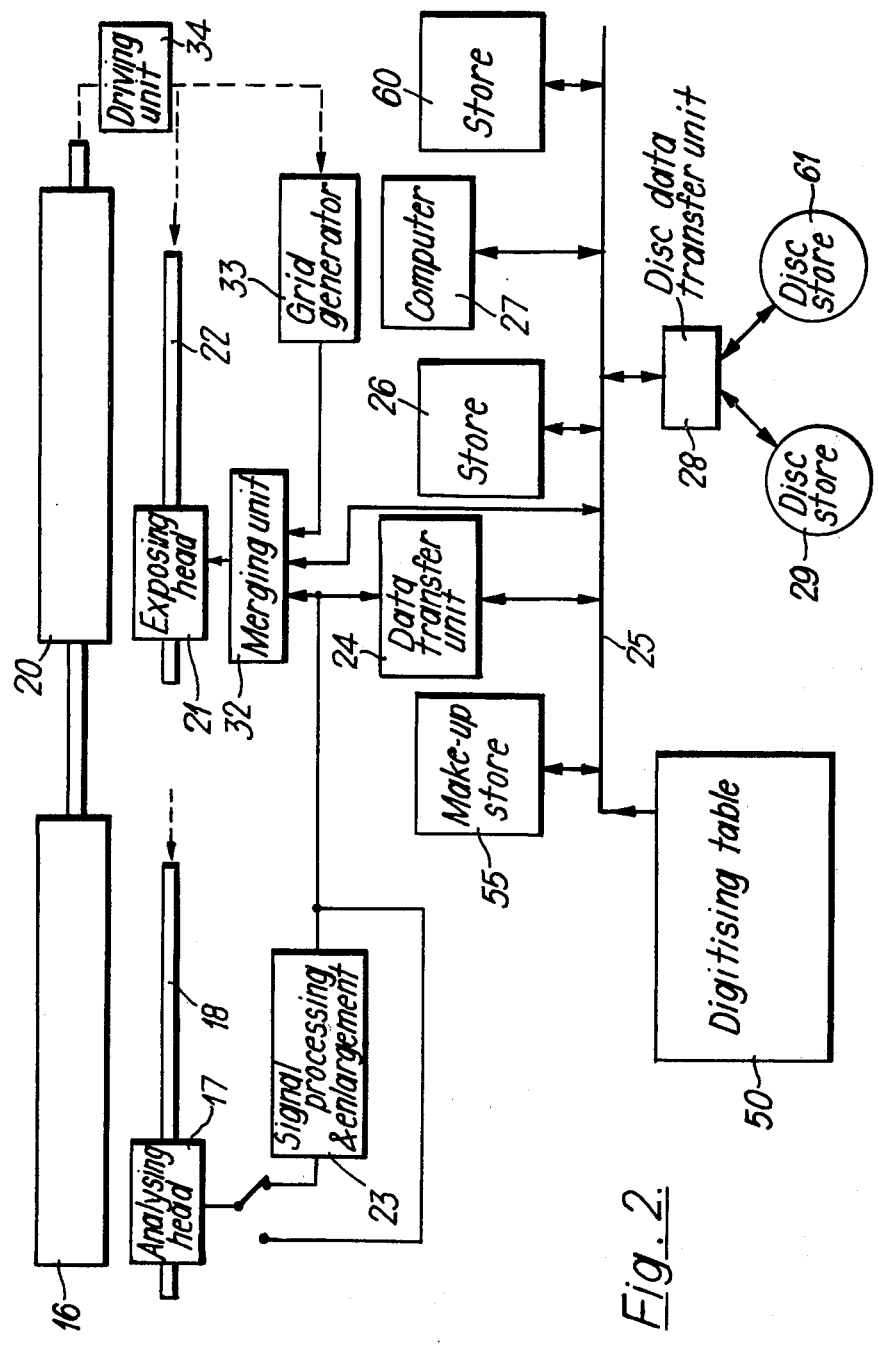
FIG. 2 is an overal block diagram of the page forming apparatus.

FIG. 2 is a block diagram of the apparatus for producing a page including the pictures and text of FIG. 1. To facilitate the understanding of this apparatus, FIGS. 3 to 6 illustrate the blocks utilised in different stages of the page reproducing system. Thus, FIG. 3 illustrates the blocks active during the scanning of the original pictures, FIG. 4 shows the blocks used during page planning using a digitiser table, FIG. 5 shows the blocks operative during assembly of an output page of data from one store to another and FIG. 6 indicates the blocks which are active during the scanning of the final page.

Figure 6:
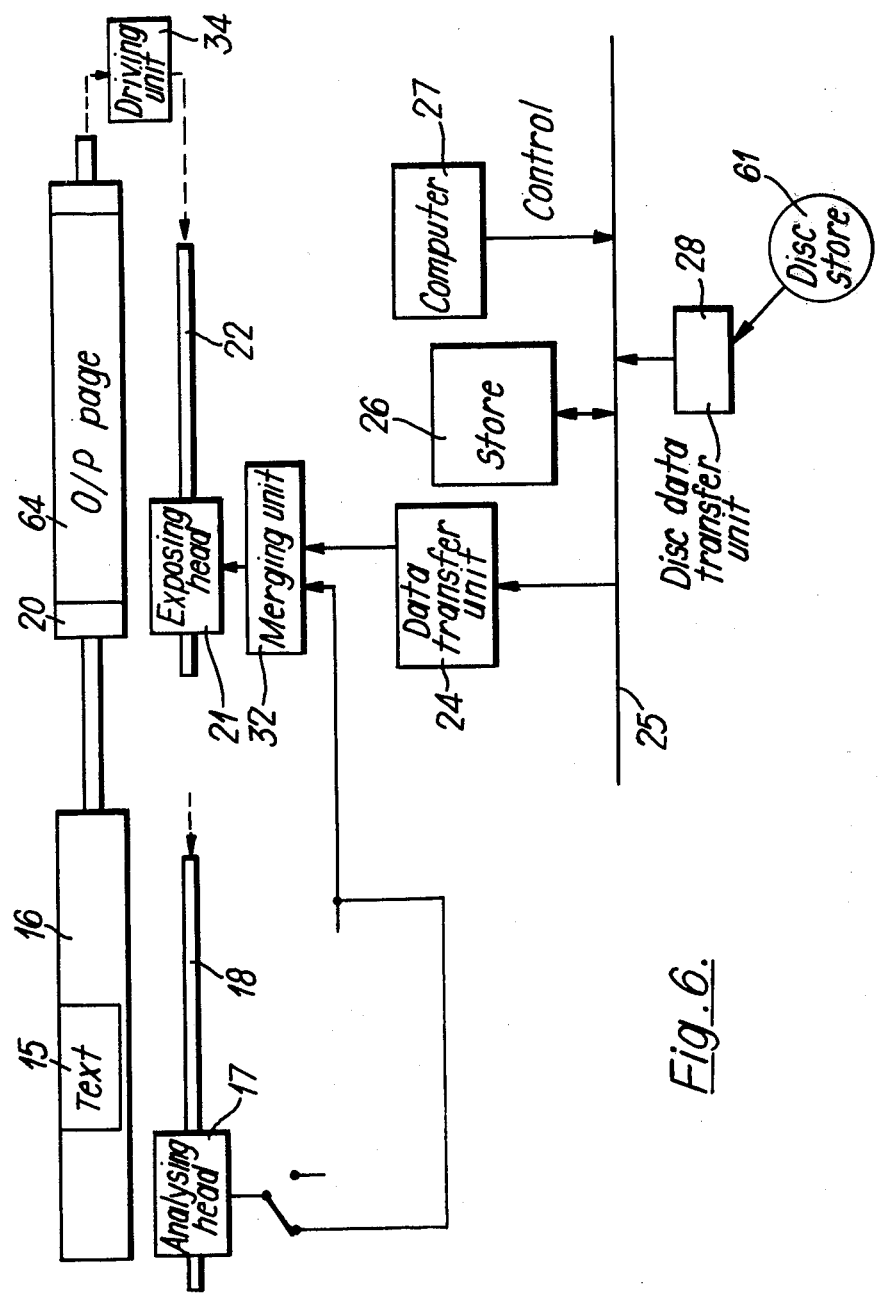

The scanner shown diagrammatically in FIGS. 2, 3 and 6 is of the cylinder type. Pictures to be scanned are mounted on a drum 16 and are scanned by an analysing head 17. Similarly, a film to be exposed (or other output surface to be treated) is mounted on the output drum 20 and is scanned by a head 21 for exposing the film or for otherwise treating the output surface. Scanning of the pictures on the input drum by the anaylysing head is effected by rotation of the drum about its axis, accompanied by slow movement of the head 17 along a shaft 18 parallel to the axis of rotation of the drum. The head 17 includes a photomultiplier and provides electric signals representing the densities of successively scanned image points of the input pictures. Where coloured originals are to be reproduced, the head 17 includes a photomultiplier for each colour component and also includes colour filters; the electric signals then represent the colour-component densities. In the drawings, for simplicity, only a single signal channel is shown.

In a similar way, the output scanning is effected by the rotation of drum 20 accompanied by slow movement of the head 21 along a shaft 22.

At the stage of operation illustrated by FIG. 3, the pictures 11,12, 13 and 14 are mounted on drum 16 and are scanned by the head 17 as described above. The resulting signals are applied to a signal processing and enlargement unit 23. This unit may, for example, modify these signals for contrast compression and colour correction by known methods, and converts the analogue signals from the head 17 into digital signals. The unit 23 also controls the enlargement required at the output drum, for example, by the method described in our British Pat. No. 1166091.

In FIG. 3, the digital signals from the unit 23 are used in two ways. They are transmitted through a data transfer unit 24, along a data highway 25, to a buffer store 26 and thence, under the control of a computer 27, they are transmitted from the buffer store 26 through a disc data transfer unit 28 to a disc store 29. The buffer store 26 is used to absorb the different data rates of the scanner and the disc 29.

Secondly, the signals from the unit 23 are applied through a merging unit 32 to the exposing head 21. The merging unit 32 also receives grid-representing signals from a grid generator 33, the operation of which is controlled by a driving unit 34 responsible for the rotation of the drums 16 and 20 and of the lead screws 18 and 22. The grid pattern may be generated for example, under the control of a photoelectric scanner which sees the passage of slits in a disc driven by the driving unit 34. The merging unit 32 superimposes the grid signals on the picture signals so that a grid pattern is superimposed on the "pre-print" reproductions 41, 42, 43 and 44 on the drum 20. Each reproduction is made at the required enlargement, the enlargement factor required for each picture being set into the unit 23; as described in British Pat. No. 1166091, the enlargement factor also controls the rate of rotation of the lead screw 22. The reproductions 41 to 44 need not be of a high quality, since they are required only for the assembly of the pictures in the locations required for the full page.

The next stage, illustrated in FIG. 4, is to transfer the "pre-prints" 41 to 44 to a digitising table 50, the "pre-prints" 41 to 44 and the text matter 15 being arranged relative to one another in the positions required for the final page. This will probably involve further trimming the reproductions, so that the effective areas of "pre-prints" 41 and 42 may be less than the areas 11a and 12a of FIG. 1.

When this trimming and relative positioning has been completed, a cursor 51 is moved over the digitising table and is stopped at critical positions, i.e. positions which are critical for the positioning of the pictures on the page. For example, for the rectangular pre-print 41, two diagonal corners would suffice to define its position on the page, the positional information being accompanied by an indication that the outline in question is rectangular. The same applies to the rectangular image areas occupied by pre-prints 42 and 43. However, for pre-print 44 which has an irregular outline, the cursor head is made to track over the outline and provides a series of position signals, accompanied by an indication that the border is irregular. As the co-ordinates for each picture are provided, the cursor is placed over the appropriate picture number in the block 52 on the right-hand side of the digitising table. The block 53 may be used to provide, when the cursor is placed over a selected square, the indication of a rectangular or irregular outline, that one area overlays another, and so on. The block 54 may be a colour patch chart to indicate the colour in which an area of type, for example, is to be reproduced. Digitising tables of this kind are known, the blocks 52 to 54 being known as a "display menu".

The information from the cursor head is applied, under the control of a computer 27, to a make-up store 55. In practice, the make-up store 55 may be a part of the computer.

The next stage, illustrated in FIG. 5, is the extraction from the store 29 of the signals for reproducing the entire page on a line-by-line basis. In other words, if one scanning line across the required page passes through two pictures and the text, one scanning line of each picture must be selected in the right order. This is achieved as follows. Under the control of the make-up store 55, the computer 27 acts through the data highway 25 and the disc data transfer unit 28 to extract from the disc 29 one full line of the first picture and to load this line into store 26. The required portion of the extracted data representing this line is transferred by the computer 27 from store 26 into a portion of a store 60. The corresponding full line of the second pictures is then extracted from disc 29 and loaded into store 26 and again the required portion of this line is transferred to store 60. A gap is left in the store 60 corresponding to the position which will be occupied by the text. When the picture data for a complete output line of the page has been assembled in store 60 in this way, this data is transferred to a second disc store 61.

This process is repeated in turn for every scan line required on the output page. The stores 26 and 60 are fast random-access stores (for example, core stores) of sufficient capacity to store one line of image data, whilst the discs 29 and 61 are relatively slow, large-capacity stores capable of holding at least one page of image data represented by many scanning lines.

FIG. 6 shows the blocks which are active during the final stage of exposing an output page. In this case, the text 15 to be incorporated in the page is mounted on the drum 16 in a position corresponding to the position it is required to occupy on the light-sensitive film 64 placed around the drum 20. The text is scanned by the analysing head 17. The resulting text signals by-pass the signal processing and enlargement unit 23 of FIG. 2 and are applied to the merging circuit 32 which also receives signals from the disc store 61. The latter signals are extracted from the disc store under the control of the computer 27, by way of the disc data transfer unit 24. Again, the buffer store 26 absorbs the differing data rates of the disc 61 and the scanner. The output of the merging circuit controls the exposing head 21, which generates a correspondingly modulated light beam scanning over the surface of the light sensitive film 64 on the output drum 20, from which film the output page is to be made.

Figure 7:
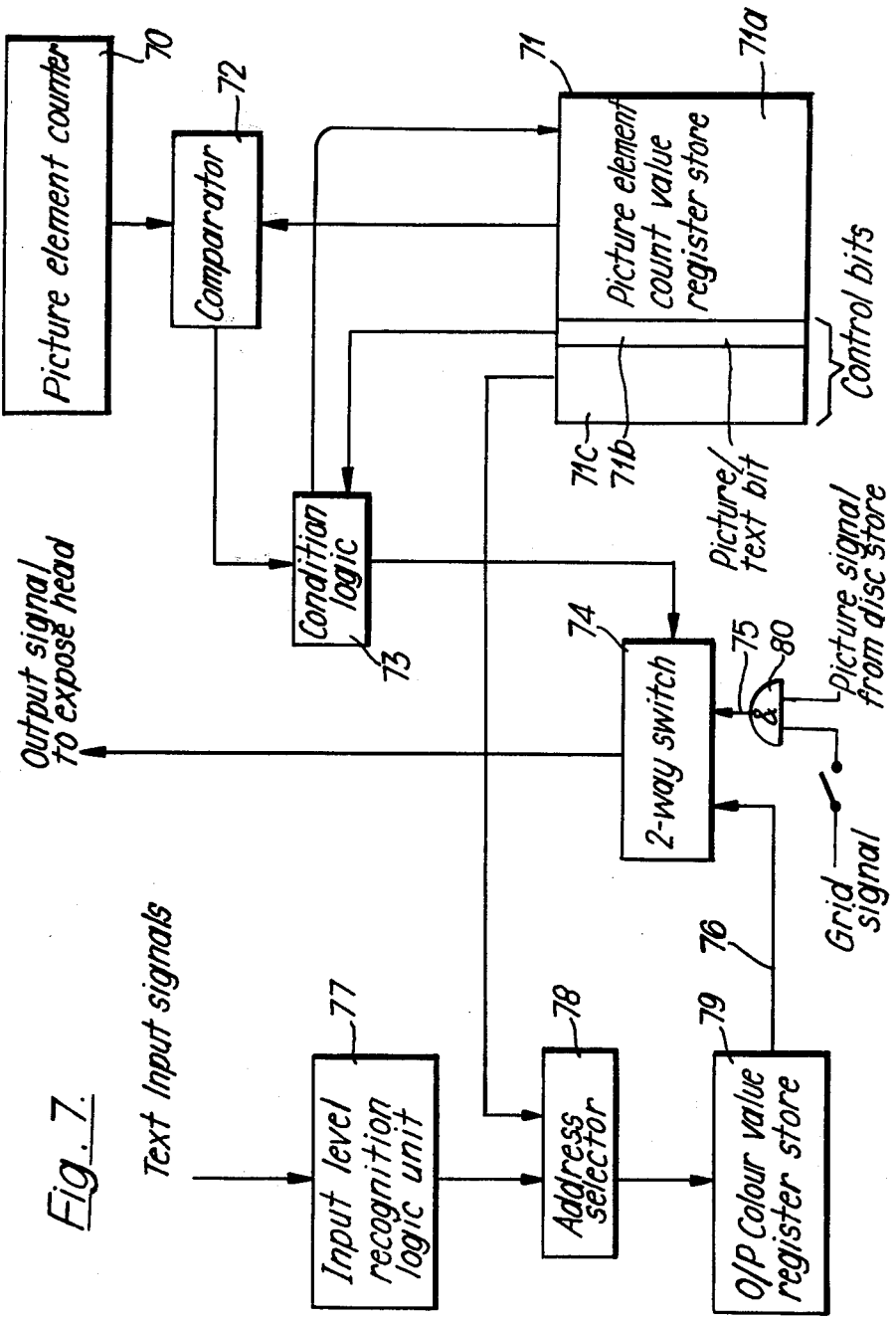
FIG. 7 is a block diagram of the merging unit apparatus of FIGS. 2 and 6.

Details of the merging circuit are shown in FIG. 7. A counter 70, supplied with pulses in proportion to the rotation of the driving unit 34 keeps a count of the picture element of the output page which has been reached by the exposing head 21. Prior to the commencement of each scan line of the output page, a picture-element count-value store 71 is loaded with the values of the picture-element counts at which the image data to be received by the exposing head is to be switched from the picture signal extracted by the disc store to the text signal derived by the analysing head, or from the text signal to the picture signal. The direction of switching is defined by a control bit attached to each picture-element count-value entered into the store 71.

During the course of the scan line, the current value of the picture-element count is continuously compared, in a comparator 72, with the next count value entered in the counter 71. When the comparator detects equivalence, a signal is sent through a condition logic unit 73 to an electronic multiplex switch 74; the condition logic unit 73 is controlled by a picture/text control bit from part 71b of the store 71 to operate the switch in the required sense.

The switch 74 receives picture information from the disc store on line 75 and text information on line 76. The text information is derived as follows. Signals derived from the analysing head 17 scanning the text are applied to an input level recognition logic unit 77. This monitors the level of the signal (or each colour component signal) from the analysing head and produces in turn a digitally coded output representing the value of this input level. The digitally coded output is applied to an address selector 78 which, under the control of control bits from the section 71c of the store 71, accesses an appropriate colour output level held in a second store 79.

The output colour level register store 79 is loaded in a preliminary operation, with sets of output colour values to be reproduced for specified input levels detected at the analysing head. This store can be updated on every scan line, but normally its contents will suffice for a run of many scan lines. This technique allows the transformation of any arbitrary input level to any other arbitrary output level, only restricted by the capacity of the store 79 and the number of independent levels that can be safely resolved by the input recognition unit 77.

If desired, more than one set of input-to-output colour transformations can be stored in the store 79, the set to be used being determined by control bits associated with the picture element value counts in store 71.

Typically, there would be eight levels of input recognition for each input colour channel. For use with a graphic-arts colour scanner analysing with 3 input colour channels and capable of exposing 2 output colour separation levels simultaneously, the size of store 79 will be $3 \times 2^3 \times 2^2 = 96$ words of $2 \times 8$ bits per output channel = 16 bits.

The store 71 would typically have a capacity of 128 words of 16 bits i.e. allowing 64 transitions between picture and text in the course of any one scan line of length about 8000 picture elements.

Such a system would permit the reproduction of up to 96 different output 4 colour tones in response to 24 different 3-colour input tones selected from one of 4 sets of input-to-output transformations in a single scan line in addition to the picture signal presented from the disc. The number and position of output tones that are in fact used in any one scan line is freely variable being fully controlled by the manner in which the data entered into stores 71 and 79 is loaded prior to commencement of the scan line. Store 79 may be a read-only memory if a restricted set of tones can be permanently accepted.

At the stage of operation represented by FIG. 3, picture signals derived from the analysing head and grid signals from the grid generator 33 are applied through an AND gate 80 to the line 75 and though the switch 74 to the exposing head. The purpose of the grid generator is to provide on the pre-prints a grid such that some of it will remain even if the margins of the pre-print are trimmed in such a manner that corner marks were removed before the pre-print reaches the digitising table.

A suitable digitising table 50 may be obtained from Ferranti Ltd. of Hollinwood, Lancashire, England, under the name Freescan Digitising Table. The disc stores shown may be obtained from Ampex Great Britain Ltd. of 39 Jermyn Street, London, England under the designation DM980. For the disc transfer unit 28, there may be used the "Disc Controller/Formatter" available from Systems Industries (U.K.) of 2 Kingsway, Woking, Surrey, England.

A suitable computer (including the make-up and buffer stores) can be obtained from Digital Equipment Co. Ltd. of Fountain House, The Butts Centre, Reading, England.

Although preferable, it is not essential to include a disc store 29; if desired, the pictures can be rescanned on the drum 16 after the digitising table has been used to provide the make-up date; the drum 16 may be used in the manner described above for the disc or the picture can be exposed separately on to the output film.

Figure 8:
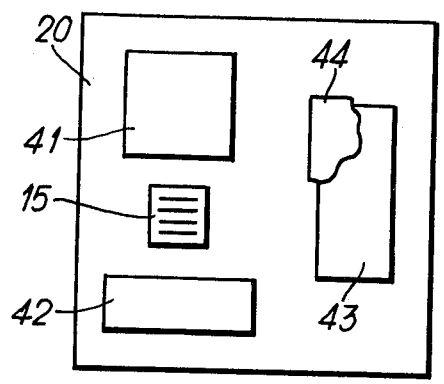
FIG. 8 illustrates the finished page.

FIG. 8 illustrates the page produced by the apparatus of FIG. 6.

We claim:

1. A method of image reproduction for forming a whole-page image from a number of separate input images, comprising the steps of: scanning each of the input images and reproducing it at the required enlargement or reduction to produce a pre-print;

assembling all the pre-prints on a digitiser table in the relative positions required for the finished page;

placing a position-sensing device on the digitiser table at points defining the boundaries of the required picture portions to be reproduced, and generating corresponding boundary-representing signals defining the positions of these points;

transferring the said boundary representing signals into a store;

under the control of the said boundary signals, deriving output signals including line signals for each of the input images crossed by the page line, within the limits defined by the said boundary representing signals for that input image; and using the output signals to control the treatment of a sheet or surface for use in the preparation of a printed page.

2. A method in accordance with claim 1, in which the signals derived by scanning each of the input images to produce the pre-prints are stored and in which, after the storing of the boundary-representing signals, the image-representing signals within the limits defined by the said boundary-representing signals are extracted from the store in a line-by-line manner to define each line in turn of the page to be produced.

3. A method in accordance with claim 2, in which the signals are initially derived by scanning the input images transferred to a first store, and in which the signals required for a line of the page to be produced are extracted from the different input image signals in the first store, in the order required, and are transferred to a second store before being used to control the treatment of the sheet or surface.

4. A method in accordance with claim 1, in which signals representing a grid pattern are combined with the signals derived by scanning the input images in the production of the pre-print.

5. A method in accordance with claim 1, in which text is to be mixed with pictures on the said output sheet or surface, and in which the text is mounted on the digitiser table with the pictures and boundary representing signals for the text are transferred to the store, and in which the signals stored for exposing the said output sheet or surface comprise gaps for the text, the text being scanned when the picture signals are extracted from the picture store, the text signals and picture signals jointly controlling the treatment of the said output sheet or surface.

6. A method in accordance with claim 5, for use in multi-colour image reproduction in which for the reproduction of the text a store is preloaded with data representing a colour value or colour values, the signals derived by scanning the text being used to address the store and to result in the extraction of signals representing the said colour value or values which are thereafter used to control the treatment of the said output sheet or surface, whereby the text is reproduced in a selected colour or selected colours.

* * * * *